United States Patent [19]

Glenn et al.

[11] Patent Number: 4,894,508
[45] Date of Patent: Jan. 16, 1990

[54] WELDER CONTROL SYSTEM

[75] Inventors: Gregory S. Glenn, Los Angeles; William O. Montjar, Palmdale, both of Calif.

[73] Assignee: Hughes Aircraft Company, Los Angeles, Calif.

[21] Appl. No.: 267,422

[22] Filed: Nov. 4, 1988

[51] Int. Cl.$^4$ ............................................. B23K 11/24
[52] U.S. Cl. ...................................... 219/110; 219/109
[58] Field of Search ............................. 219/110, 109

[56] References Cited

U.S. PATENT DOCUMENTS

| 2,942,097 | 6/1960 | Baas | 219/110 |
| 3,191,441 | 6/1965 | Erickson | 219/110 |
| 3,406,272 | 10/1968 | Ehrlich | 219/109 |
| 3,440,389 | 4/1969 | Meyer | 219/110 |
| 3,778,581 | 12/1973 | Denny | 219/110 |

FOREIGN PATENT DOCUMENTS

| 57-11785 | 1/1982 | Japan | 219/110 |
| 460143 | 5/1975 | U.S.S.R. | 219/110 |

*Primary Examiner*—Clifford C. Shaw
*Attorney, Agent, or Firm*—Terje Gudmestad

[57] ABSTRACT

A control system for parallel gap welders typically employed to weld contacts to solar cells or wires to integrated circuit chips is disclosed. The system monitors the temperature generated by the welder at the work pieces. The system automatically terminates the weld operation should the weld temperature reach a maximum predetermined temperature, thereby preventing overheating the weld joint and adjacent parts. Alternatively, if the weld temperature does not reach a minimum predetermined temperature the system automatically signals the weld operator that the joint must be rewelded to avoid an incomplete or cold weld. A quality weld can therefore be repeated.

11 Claims, 1 Drawing Sheet

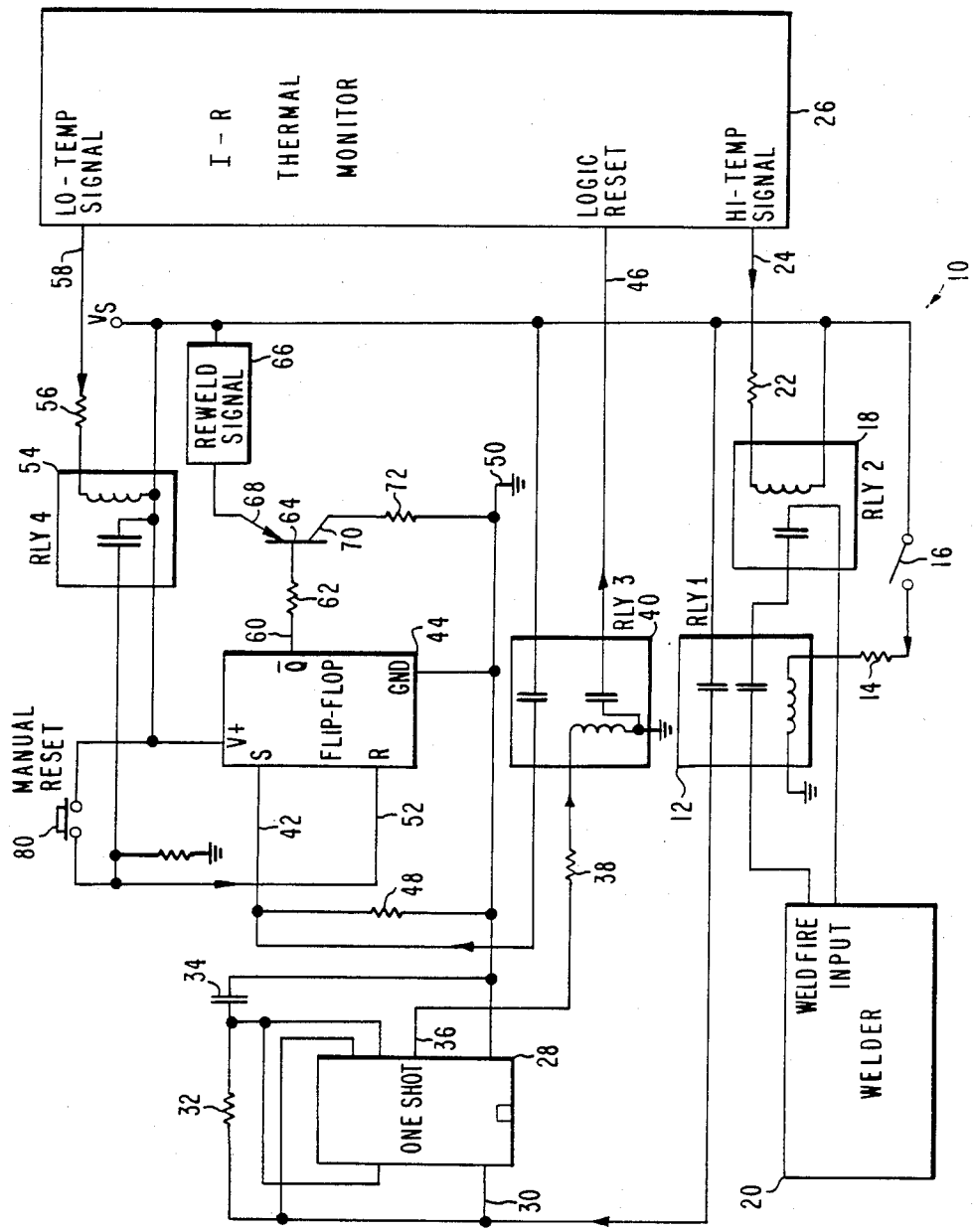

WELDER CONTROL SYSTEM

BACKGROUND OF THE INVENTION

1. Field of the Invention

The invention relates generally to welding arrangements and more particularly to a circuit arrangement for controlling welding operations.

2. Description of Related Art

Today, solar cells provide an energy source to power everything from cars to satellites. Solar cells collect the energy from the sun turning this energy into useful electrical energy. A typical solar cell consists of a very thin disc-shaped wafer of semiconductor material having very thin metal contacts on both the front and back surfaces of this thin wafer. The lateral dimensions of a typical solar cell may range from about 2 cm×2 cm to 8 cm×8 cm and the thickness of the cell may be about 2 mm. An individual single PN junction solar cell as described above which is made of silicon would typically generate about 0.5 volts (for gallium arsenide solar cells about 0.9 volts). Moreover, no matter how large the solar cell, it will still only generate about 0.5 volts (silicon). Consequently, to achieve a system voltage to power electrical components and motors, which typically require much greater than 0.5 volts, many solar cells must be connected in series until the desired system voltage is achieved. For example, for a satellite having a system voltage of 60 volts, 120 individual solar cells each generating 0.5 volts must be connected together in series.

To connect individual solar cells, contact tabs must be attached to and between all the solar cells needed to complete a solar cell array. These solar cell contact tabs are welded or soldered to the thin contact pads of the respective solar cells, the contact pads typically being about 5 microns thick. In space applications, welding of the contact tabs is preferred over soldering because weld joints can survive long time extreme thermal cycling from the orbital environment, whereas solder joints degrade more readily. The quality of the weld joint must be controlled to achieve a reliable and strong weld which forms a good electrical contact. If the contacts are subjected to an undesirably high temperature, the solar cell semiconductor material could be damaged. On the other hand, if the contacts are subjected to an undesirably low temperature, an incomplete or cold weld may result greatly degrading the performance of the solar cell. In the case where solar cells are employed on satellites or space stations, once the satellite or space station is launched into space any manufacturing defects in any of the solar cells is extremely difficult to fix.

Traditionally welders, such as parallel gap welders, have been used to affix contacts to solar cells. Such parallel gap welders, however, typically have output adjustments for only voltage and pulse duration. Furthermore, there is no means to adjust these parameters on a weld-by-weld basis. From one solar cell to another cell and interconnect contact surface resistance can vary greatly which can effect the total energy actually delivered to the weld joint. Various sensors for indirectly monitoring weld temperature have been used to monitor the welding process. For example, infrared radiation devices collect the infrared rays emitted by the work pieces as they are being heated by the welder in the vicinity of the weld zone.

It would be a great advancement to the art to provide a simple circuit to control the quality of the solar cell welding operation.

SUMMARY OF THE INVENTION

It is therefore an object of the invention to provide a control circuit to interface between a welder and a temperature sensor apparatus.

It is also an object of the invention to provide a control circuit that brings the weld temperature in a welding operation to within a predetermined temperature range window.

It is a further object of the present invention to provide a control circuit that responds rapidly to discontinue a welding operation when a predetermined critical temperature is reached.

It is an additional object of the present invention to provide a control circuit that can be fabricated using standard off-the-shelf components and products.

A control circuit according to the present invention includes a control circuit interfacing an infrared (I-R) monitor and welder apparatus. The infrared monitor generates output signals at a predetermined low temperature and a predetermined high temperature. The control circuit provides a switch means for firing the welder. At the same time, a short pulse is generated which sets a flip-flop circuit. An alarm reweld circuit is coupled to the output of the flip-flop circuit. Upon receiving a minimum desired low temperature signal from the infrared monitor, the flip-flop is reset and the alarm reweld circuit is deactivated. If the low temperature signal is not received then an alarm signals that a reweld operation is required to achieve an effective weld point. Upon a high temperature signal from the infrared monitor, the weld fire signal to the welder is interrupted before the temperature at the weld joint can reach a critical point at which the solar cell could be cracked or the silver innerconnects in the solar panel melted.

Other and further objects, advantages and characteristic features of the present invention will become readily apparent from the following detailed description of preferred embodiments of the invention when taken in conjunction with the appended claims.

BRIEF DESCRIPTION OF THE DRAWINGS

The sole drawing is an electrical circuit schematic of a welding arrangement in accordance with the invention.

DETAILED DESCRIPTION OF THE INVENTION

Referring now to the sole figure, a welding arrangement 10 is disclosed having a first double pole single throw relay 12. The relay preferably is a high speed relay, and more specifically a DIP REED relay. The coil of the first relay 12 is connected through current limiting resistor 14 to one of the contacts of switch 16, a single pole, single throw microswitch. The other contact of switch 16 is connected to a supply voltage $V_s$. Switch 16 may be incorporated into a foot pedal arrangement allowing a welder operator to control the actual welding operation while leaving the operator's hands free to handle the work pieces. Alternatively, switch 16 could be replaced with a transistor switch in an automatic welding operation. A second relay 18 has a single pole which is connected in series with one of the poles of first relay 12, these two poles being connected across the weld fire inputs of welder 20. Welder 20 may be a Hughes Welder Model MCW550, for example. The second relay 18, which may be a normally open relay as shown in the figure, has its single pole held closed during normal operation. Its coil is activated by the supply voltage $V_s$ and grounded via current limiting resistor 22 through the high temperature signal output terminal 24 of an infrared thermal monitor 26. Thermal monitor 26 may be one of the many commercially available thermal monitors which provide high temperature and low temperature output signals at preselected temperatures, such as a Vanzetti TM-2, for example.

The second pole of the first relay 12 is connected at one end to the supply voltage $V_s$ and the other end to the input 30 of a one-shot timer circuit 28, which may be composed of a 555 timer, resistor 32 and capacitor 34, for example. The values for resistor 32 and capacitor 34 are selected to yield the desired output pulse width from the timer circuit 28 which typically may be between four microseconds and 50 microseconds, a period much faster than a weld operator could depress and release switch 16. The output 36 of the timer circuit 28 is connected through current limiting resistor 38 to the coil of a third relay 40 which is shown having two poles and a single throw. One of the poles is connected between the supply voltage $V_s$ and the set input 42 of flip-flop 44. The other pole of the third relay 40 is connected between ground and the logic reset input 46 of the infrared monitor 26. In the flip-flop circuit, the flip-flop component 44 may be a 4013 Dual D flip-flop, for example. Pull down resistor 48 is connected between the set input 42 of the flip-flop 44 and ground 50. The reset input 52 of the flip-flop 44 is connected through the single pole of fourth relay 54 to the supply voltage $V_s$. The coil of this relay 54 is connected through current limiting resistor 56 to the low temperature signal output terminal 58 of the infrared monitor.

The output 60 of the flip-flop 44 is connected through base resistor 62 to transistor 64. Transistor 64 may be a PNP as shown in the figure if the base is connected to the inverting output of the flip-flop 44 or an NPN should the base of the transistor be connected to the noninverting output (not shown) of the flip-flop. An alarm reweld circuit 66 is connected between the supply voltage $V_s$ and the emitter 68 of transistor 64, and the collector 70 if transistor 64 is grounded through resistor 72. The alarm 66 may be an audible type alarm to alert the welder operator that a reweld is required. Alternatively, the transister output generates a reweld signal which could trigger an automatic welder to weld again. Resistors 62 and 72 are selected to appropriately bias the transistor for the desired current gain and voltage necessary for the alarm circuit.

A description of the basic operation of the circuit now follows using an audible alarm for the reweld signal and a Vanzetti TM-2 for example purposes:

Low Temperature Weld

The welder 20 is fired by pressing switch 16 which activates the coil of the first relay 12. Since second relay 18 is already closed, the weld fire circuit is complete and the weld operation begins. At the same time, the other pole of first relay 12 closes delivering a trigger signal to the timer circuit 28, which in response generates a short output pulse. This short pulse activates the coil of the third relay 40 momentarily closing its poles. The logic of the infrared monitor 26 is reset, and the flip-flop 44 is set such that the output signal at output 60 is sinked low and the transistor 64 turns on. During the weld pulse, it is possible that the weld temperature will not reach a desired predetermined minimum temperature to achieve a good weld. If this should occur, the alarm circuit 66 which has been turned on by transistor 64, remains on. The welder operator therefore is alerted to reweld the work pieces again to achieve a good reliable weld. A manual reset switch 80 may be depressed to reset the flip flop 44 and turn off the alarm should there be an anticipated long delay until the next weld operation. If the weld temperature does reach a desired predetermined minimum temperature then a low temperature signal will be generated by the infrared monitor at the low temperature signal output 58 activating the coil of fourth relay 54, closing its single pole and delivering a signal to the reset input 52 of flip-flop 44. The flip-flop 44 accordingly generates a high signal at its inverting output 60 turning off transistor 64 which in turn deactivates the alarm circuit 66. The alarm circuit is turned off during the weld pulse (generally less than 140 milliseconds) and the welder operator is not signaled to reweld. Consequently, the operator proceeds to the next weld joint. If the reweld reaches the minimum preset temperature then the alarm is turned off automatically as described above.

High Temperature Weld

As described above, switch 16 is closed firing the welder and resetting the logic of the infrared monitor 26 and setting the flip-flop 44. Should the temperature of the weld during the welding operation reach a predetermined maximum desired temperature, the infrared monitor 26 will generate a high temperature signal at output 24 which deactivates the coil of the second relay 18 and thereby opens its pole. The weld fire signal therefore is interrupted terminating the weld before the work pieces being welded can be damaged.

Various modifications may be made to the above-described embodiment without departing from the scope of the invention. For example, the alarm may be replaced by a switching circuit which automatically causes the welder to reweld should the infrared monitor generate a low temperature signal. The four relays which are switches, may be replaced by other switching devices such as solid state devices, for example. Also a manual reset switch 80 may be incorporated into the circuit to manually reset the flip-flop 44 and inactivate the alarm circuit, should there be a long delay before rewelding. The welding arrangement described above can also advantageously be used to weld wire contacts to integrated circuits devices. Thus, although the present invention has been shown and described with reference to particular embodiments, nevertheless, various modifications and changes obvious to one skilled in the art are deemed to be within the spirit, scope and contemplation of the invention, as set forth in the appended claims.

What is claimed is:
1. A welding arrangement comprising:
 a welding apparatus for welding in response to a weld fire signal;
 an infrared monitor for sensing weld temperature generated by said welding apparatus and generating output signals at a predetermined low temperature and a predetermined high temperature;
 pulse generating means for generating a pulse of a predetermined width;

switch means for simultaneously triggering said pulse generating means to generate said pulse of a predetermined width and generating a weld fire signal to weld;

flip-flop circuit means being set by said pulse generated by said pulse generating means and being reset by a low temperature signal from said infrared monitor;

reweld signal generating means responsive to the output of said flip-flop circuit means for generating a reweld signal upon a low temperature signal from said infrared monitor; and means for terminating said weld fire signal upon a high temperature signal from said infrared monitor.

2. The welding arrangement defined in claim 1 wherein said infrared monitor includes a logic reset input and further includes means for resetting the logic of said infrared monitor.

3. The welding arrangement defined in claim 2 wherein said weld fire signal terminating means includes relay means in series with said switch means and said welder, said relay means breaking said weld fire signal to said welder in response to a high temperature signal from said infrared monitor.

4. The welding arrangement defined in claim 3 wherein said reweld signal generating means includes an alarm for generating a reweld signal and means for coupling said alarm to the output of said flip-flop circuit means.

5. The welding arrangement defined in claim 4 further including a manual reset switch coupled to said flip-flop circuit means to manually set said flip-flop circuit means and turn off said alarm.

6. In a welding arrangement including a welding apparatus for welding in response to a weld fire signal, an infrared monitor for sensing the weld temperature of the welding apparatus and giving output signals at a predetermined low temperature and a predetermined high temperature, and a source of power, a weld control interface circuit electrically coupled between the welding apparatus and infrared monitor for controlling the operation of the welding apparatus based on signals from the infrared monitor, comprising:

a first relay in which a solenoid coil controls a double pole single throw switch such that when the coil is activated both poles are closed;

a second relay in which a solenoid coil controls a single pole single throw switch such that when the coil receives a high-temperature signal from the infrared monitor the coil is deactivated and the pole is opened, said one pole of said second relay and one of said two poles of said first relay being connected in series with each other and the welder to generate a weld fire signal when said first and second relays are both activated;

switch means for activating said first relay coil such that the welder begins welding;

a third relay in which a solenoid coil controls a double pole single throw switch such that when the coil is activated both poles are closed;

a timer circuit for generating a pulse trigger by the closing of the other of said poles of said first relay, said triggered pulse activating said third relay coil for a predetermined pulse width;

a flip-flop circuit the output thereof being set by said third relay when activated, and the output thereof being reset by a low-temperature signal from said infrared monitor; and reweld signal generating means coupled to the output of said flip-flop for generating a reweld signal upon a low-temperature signal from said infrared monitor.

7. The welding arrangement defined in claim 6 wherein said reweld signal generating means includes an alarm for generating an audible alarm to signal the weld operator to reweld and a switching transistor connected between said alarm and said flip-flop.

8. The welding arrangement defined in claim 7 further including means for manually resetting the output of said latch circuit to turn off said alarm.

9. The welding arrangement defined in claim 8 wherein said coupling means includes a transistor connected to the output of said latch circuit so that when said transistor is conducting the alarm is grounded through the collector and emitter thereof.

10. The welding arrangement defined in claim 9 wherein said predetermined pulse width is between about 4 ms to 50 ms.

11. The welding arrangement defined in claim 9 wherein said switch means is a single pole single throw switch.

* * * * *